(12) United States Patent
Mingee

(10) Patent No.: US 11,756,460 B1
(45) Date of Patent: Sep. 12, 2023

(54) FLAG HOLDER FOR VEHICLES

(71) Applicant: John Mingee, Ocala, FL (US)

(72) Inventor: John Mingee, Ocala, FL (US)

( * ) Notice: Subject to any disclaimer, the term of this patent is extended or adjusted under 35 U.S.C. 154(b) by 278 days.

(21) Appl. No.: 17/227,014

(22) Filed: Apr. 9, 2021

(51) Int. Cl.
  *G09F 17/00* (2006.01)
  *B60R 11/00* (2006.01)

(52) U.S. Cl.
  CPC ............ *G09F 17/00* (2013.01); *B60R 11/00* (2013.01); *B60R 2011/004* (2013.01); *B60R 2011/0059* (2013.01); *B60R 2011/0071* (2013.01); *B60R 2011/0084* (2013.01); *G09F 2017/0075* (2013.01)

(58) Field of Classification Search
  CPC . G09F 17/00; G09F 2017/0075; B60R 11/00; B60R 2011/004; B60R 2011/0059; B60R 2011/0071; B60R 2011/0084
  See application file for complete search history.

(56) References Cited

U.S. PATENT DOCUMENTS

| | | | | |
|---|---|---|---|---|
| 1,857,774 A * | 5/1932 | Wickman | ............... | B60R 13/00 248/362 |
| 2,836,914 A * | 6/1958 | Nelson | ................. | G09F 21/042 16/361 |
| D316,829 S * | 5/1991 | Davis | ........................ | D10/109.1 |
| 5,127,564 A * | 7/1992 | Romero | .................... | B60R 9/00 224/570 |
| 5,605,264 A * | 2/1997 | Neal | ......................... | B60P 3/14 224/404 |
| 5,800,106 A * | 9/1998 | Miller | .................... | B60P 7/0807 410/97 |
| 5,813,164 A | 9/1998 | Liberto | | |
| D411,484 S * | 6/1999 | Hill | ............................... | D11/182 |
| 6,192,824 B1 * | 2/2001 | Chang | .................... | G09F 17/00 116/202 |
| 6,550,952 B1 * | 4/2003 | Hulse | .................. | G02B 6/0018 362/555 |
| 6,732,984 B2 * | 5/2004 | Tsai | ....................... | A47F 5/0006 248/161 |
| 6,739,084 B1 | 5/2004 | Hansen | | |
| 6,783,311 B2 * | 8/2004 | Sauerwald | ............ | B60P 7/0823 410/97 |

(Continued)

*Primary Examiner* — John Fitzgerald
*Assistant Examiner* — Tania Courson
(74) *Attorney, Agent, or Firm* — SANCHELIMA & ASSOCIATES, P.A.; Christian Sanchelima; Jesus Sanchelima

(57) ABSTRACT

A flag holder for vehicles including a rack assembly and a clamp assembly is disclosed. These assemblies in conjunction with one another provide a simple solution to retrofitting a flag holder to various pickup truck bed sizes. The rack assembly includes multiple pole sleeves linked together through horizontal segments that run parallel to the truck bed edge the rack assembly is mounted on. The clamp assembly includes a gripping member and a securing member that can tighten and loosen the present invention from the truck bed via a knob. The horizontal segments as well as the pole sleeves include an attachment portion for bumpers to be mounted to. The bumpers help level the rack assembly as well as protect the present invention and vehicle from damage while the vehicle is in motion. Also disclosed is a light assembly that is capable of illuminating face plates from the interior or exterior.

7 Claims, 5 Drawing Sheets

(56) References Cited

U.S. PATENT DOCUMENTS

| | | | |
|---|---|---|---|
| 7,401,508 B1 * | 7/2008 | Peterson | G01W 1/14 |
| | | | 73/170.17 |
| 7,472,510 B1 | 1/2009 | Fasola | |
| 9,159,254 B2 * | 10/2015 | Oyoung | G09F 17/00 |
| 9,986,827 B1 | 6/2018 | Long | |
| 10,798,930 B1 | 10/2020 | Rodriguez | |
| 2001/0033481 A1 * | 10/2001 | Chien | A43B 13/12 |
| | | | 362/34 |
| 2011/0179692 A1 * | 7/2011 | McKnight | A01K 97/08 |
| | | | 70/20 |

* cited by examiner

FLAG HOLDER FOR VEHICLES

BACKGROUND OF THE INVENTION

1. Field of the Invention

The present invention relates to a flag holder for vehicles and, more particularly, to a flag holder for vehicles that can be retrofitted into existing truck beds.

2. Description of the Related Art

Several designs for a flag holder for vehicles have been designed in the past. None of them, however, include distal telescopic segments to be fit in various truck bed sizes.

Applicant believes that a related reference corresponds to U.S. Pat. No. 6,739,084 issued for a fishing rod rack for the support of a plurality of fishing rods with the fishing rod rack spamming the width of the bed of a pickup truck. Applicant believes another related reference corresponds to U.S. Pat. No. 7,472,510 for a fishing rod holder for mounting within a pickup truck bed. None of these references, however, teach of a flag holder for vehicles that includes telescopic adjustments with a clamp assembly to be fit to a truck bed.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a flag holder for vehicles that includes a telescopic segment to be fit to a multitude of vehicle sizes.

It is another object of this invention to provide a flag holder for vehicles that includes bumpers to be mounted to a rack assembly for leveling and counteract vibrations.

It is still another object of the present invention to provide a flag holder for vehicles with a light assembly to luminate the exterior of the rack assembly as well as the interior.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
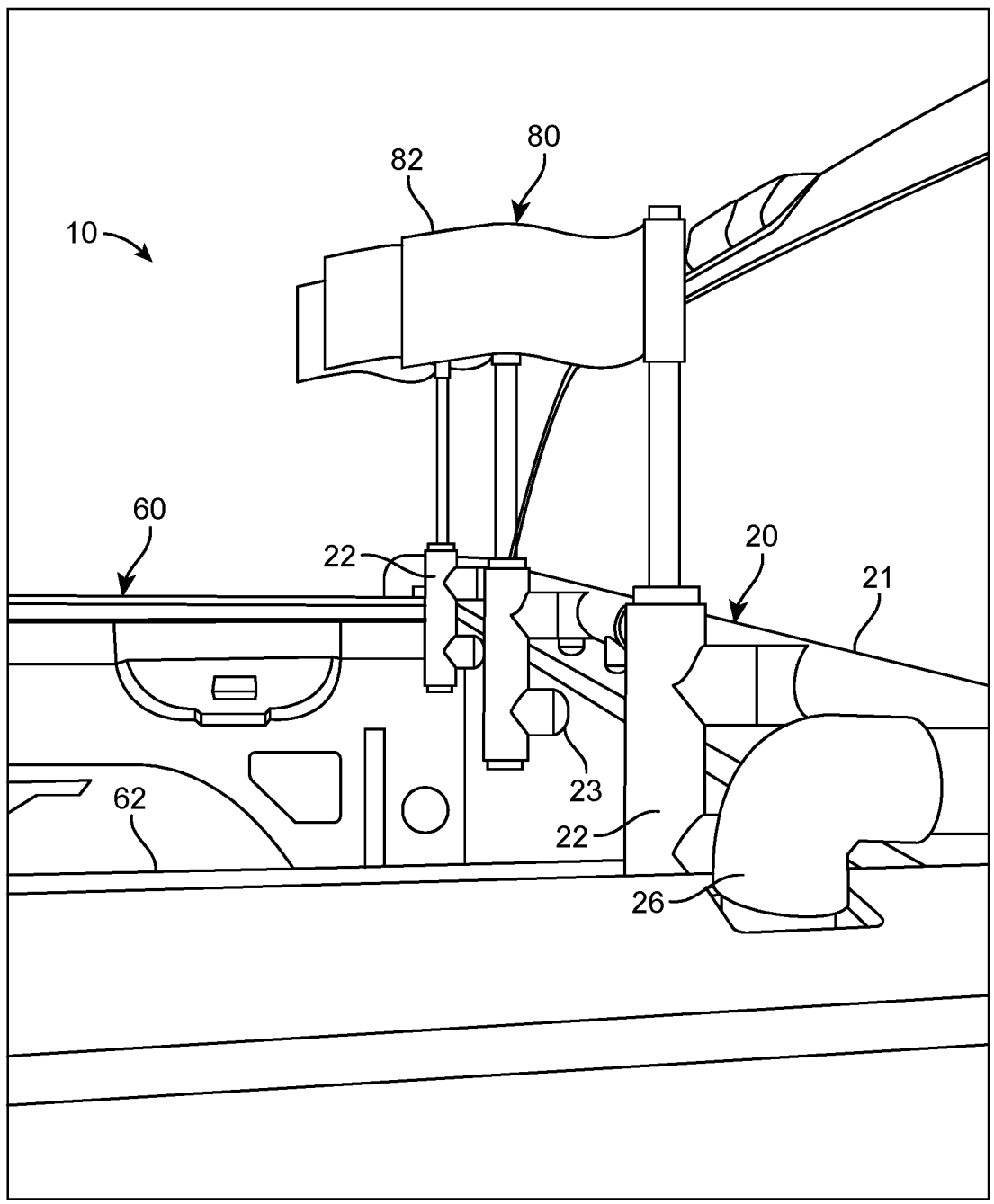
FIG. 1 represents an operational view of rack assembly 20 engaging with the truck assembly 60.

Referring now to the drawings, where the present invention is generally referred to with numeral 10, it can be observed that it basically includes a rack assembly 20, a clamp assembly 40, a truck assembly 60, a flag assembly 80, and a light assembly 100.

Figure 2:
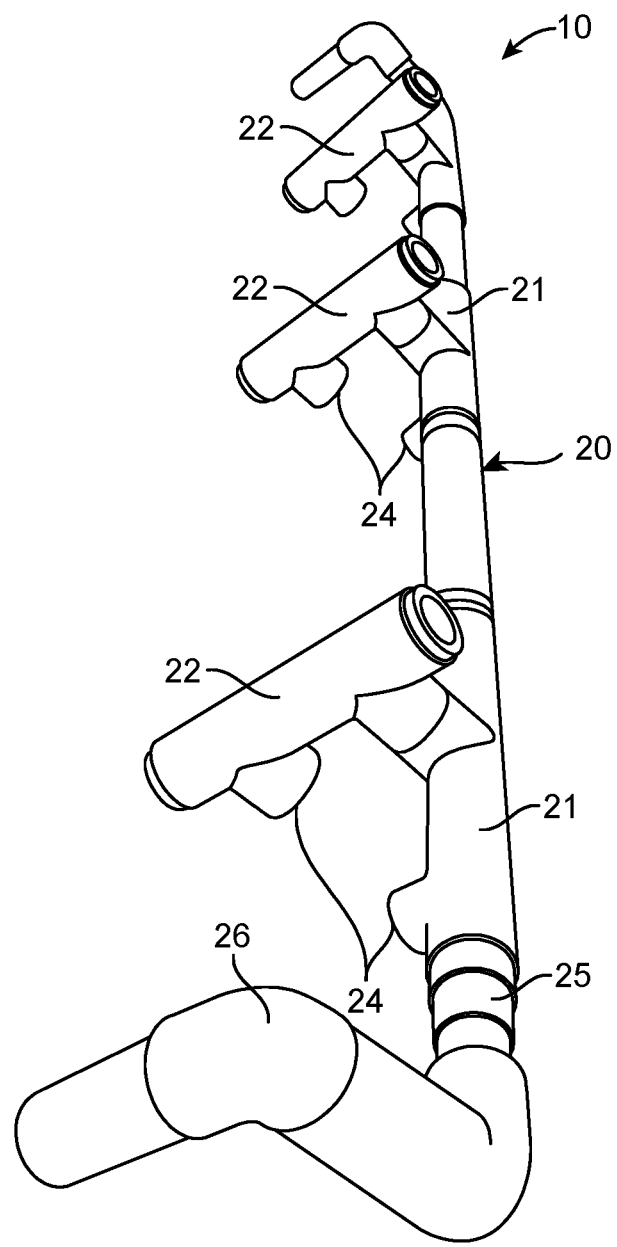
FIG. 2 shows an isometric view of rack assembly 20.

As best illustrated in FIGS. 1 and 2 rack assembly 20 may be made of a series of interconnected tubes. It may be preferable for the rack assembly 20 to be made of a rigid material such as metal or a hard plastic. The rack assembly 20 may include a plurality of pole sleeves 22. The pole sleeves 22 may be multiple hollow vertical tubes with a top portion and a bottom portion. The top portion of pole sleeves 22 may include a through hole to the exterior of the bottom portion that allows for a flagpole 82 of flag assembly 80 to be secured therein. It should be understood that flagpole 82 or various objects with poles such as an umbrella or fishing rods may also fit within the pole sleeves 22. Extending perpendicularly from the bottom portion may be an attachment portion 24 that serves as a mounting point for bumpers 23.

The bumpers 23 may help prevent damage to the present invention as well as the prevent the rack assembly from scratching the vehicle while said vehicle is in motion. The bumpers 23 may also aid in leveling the rack assembly 20 to a user's liking with respect to the level of the truck bed 62 of truck assembly 60. In one embodiment bumpers 23 may be made of rubber and semi dome shaped. The bumpers 23 may include a threaded portion at the base of the semi dome shape to be secured to attachment portion 24. The threaded portion may help facilitate the leveling of rack assembly 20 as a user can simply tighten or loosen the bumpers 23 within their respective attachment portion 24.

Extending perpendicularly from the top portion may be a mounting portion that secures the pole sleeve 22 to a horizontal segment 21. In one embodiment the horizontal segment 21 may serve as horizontal mounting points with respect to the multiple hollow vertical tubes of pole sleeves 22. Said horizontal segments 21 may be hollow tubes that link multiple pole sleeves 22 in their vertical position and are parallel to the truck bed 62 edge. It may be suitable for the distal ends of rack assembly 20 to include a telescopic segment 25. Said telescopic segment may be cylindrical and similar in diameter to the horizontal segments 21. The telescopic segment 25 may adjust the rack assembly to a width that is suitable for the truck bed 62 that the rack assembly 20 is mounted to. The telescopic segment 25 may provide a transition from the horizontal segment 21 into the truck bed mount 26.

The truck bed mount 26 may be a hollow tube with a downward elbow portion of the rack assembly 20 with respect to the horizontal segments 21. The truck bed mount 26 may be on either side of the rack assembly 20. The truck bed mount 26 may include an internally mounted fastener to secure the rack assembly 20 to tie down points along the lateral top edges of the truck bed 62. It may be suitable for the fastener to take the form of a steel cable running internally throughout the interconnected tubes of the rack assembly 20. Said steel cable being secured to the tie down points of truck bed 62.

Figure 3:
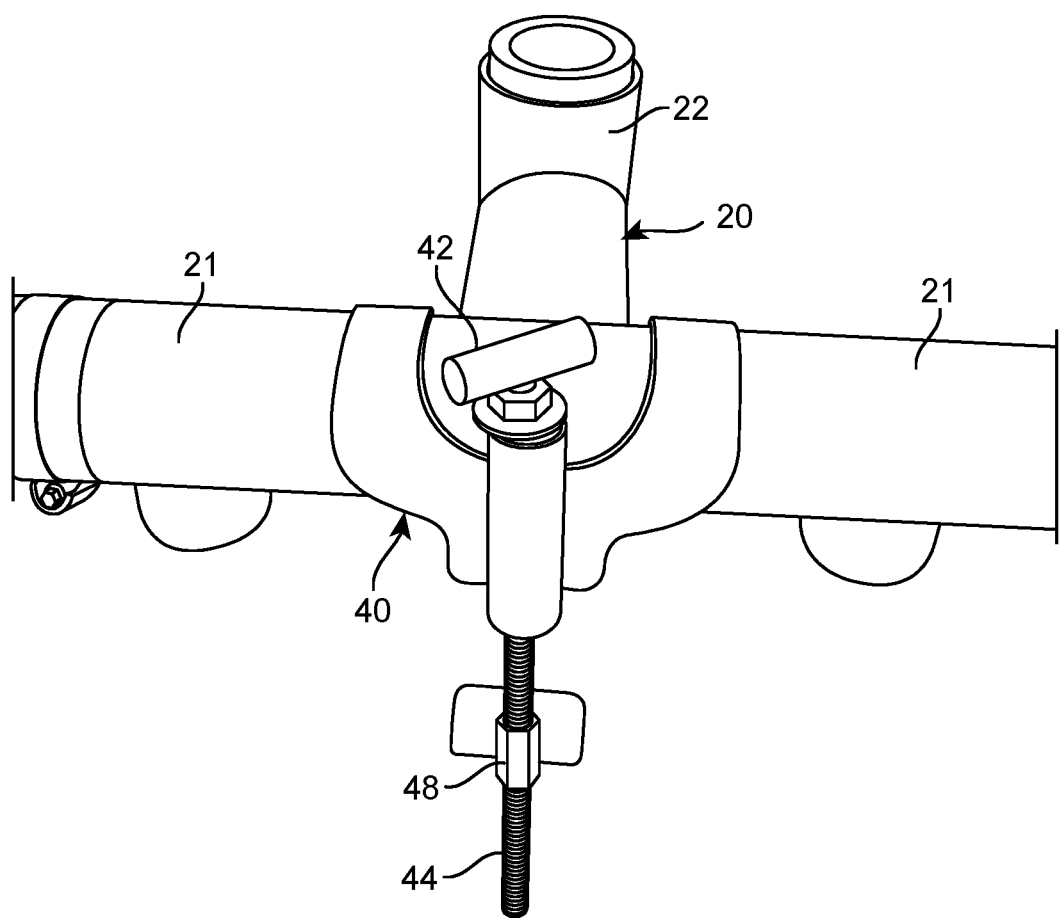
FIG. 3 illustrates clamp assembly 40 engaging with rack assembly 20
Figure 4:
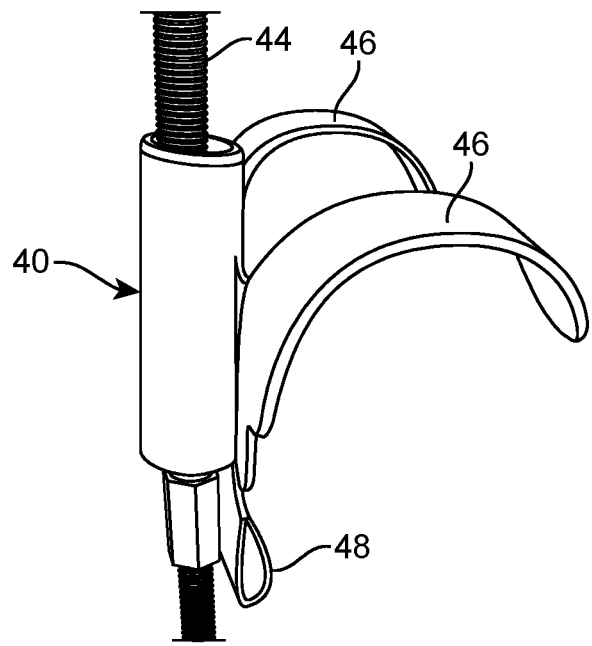
FIG. 4 is a representation of an isometric view of clamp assembly 40.

Best demonstrated in FIGS. 3 and 4 the present invention may include a clamp assembly 40. The clamp assembly 40 may fit on a rear portion of the rack assembly 20 between the truck bed 62 and a truck cabin. It may be preferable for the clamp assembly 40 to include a knob 42 capping a threaded member 44 extending therefrom. Located on the threaded member 44 may be a gripping member 46 and a securing member 48. The gripping member 46 may include a flat U-shaped member folded over horizontally. The flat U-shaped member may grip the rack assembly 20 from above at the junction of the pole sleeves 22 and the horizontal segment 21. The base of the U-shape of the gripping member 46 may include a vertical hollow cylinder that may receive threaded member 44. Located on the distal end of the threaded member 44, relative to knob 42, may be securing member 48. In one iteration the securing member 48 may take the form of a flat square with a front face and a bottom lip curling upward toward knob 42 on said front face. Mounted on the opposite face of said bottom lip may be an elongated threaded hexagon spanning the height of the flat square portion of the securing member 48. It may be suitable for the turning of knob 42 to draw the securing member 48 towards the gripping member 46. The bottom lip of the gripping member 46 may then engage with an exterior lip of the truck bed. Thereby securing rack assembly 20 to the truck bed 62. It may be suitable for clamp assembly 40 to be made of a metallic material.

Figure 5:
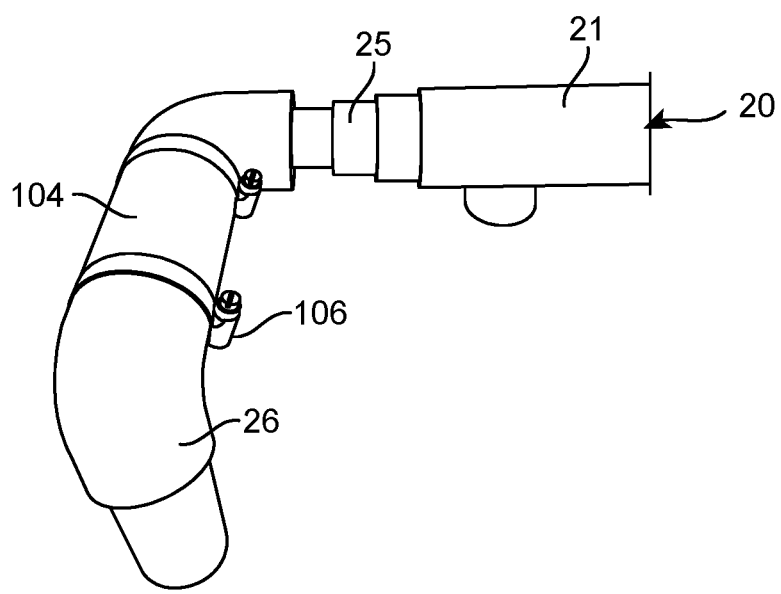
FIG. 5 depicts the telescopic segment 25 used to adjust the fit of the distal ends of the present invention to a vehicle.
Figure 6:
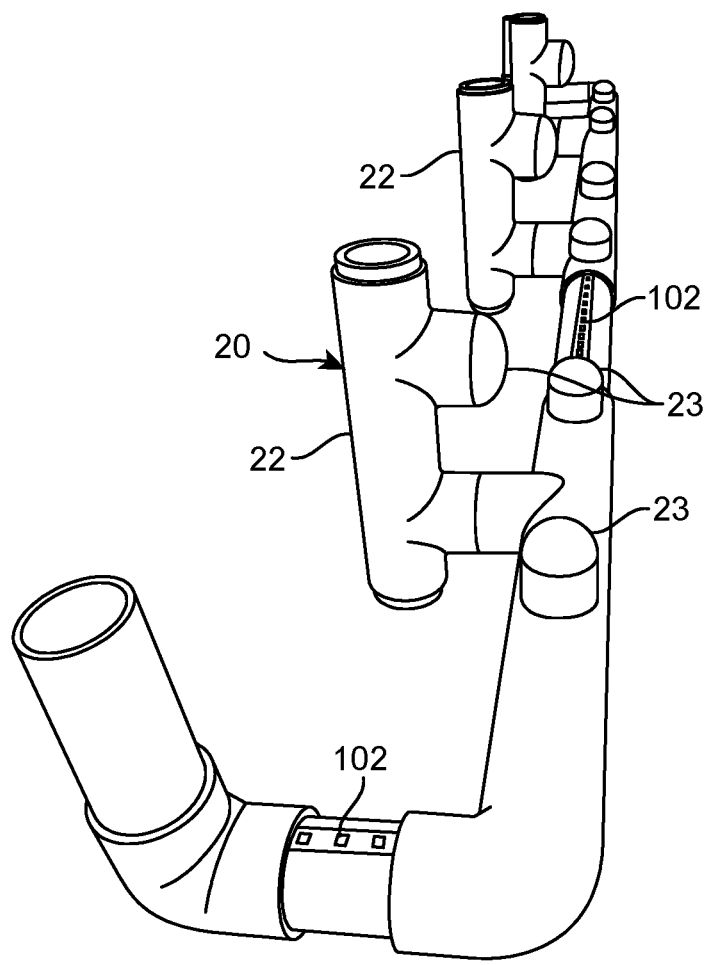
FIG. 6 demonstrates the plurality of bumper 23 and LED strip 102 mounted to the underside of rack assembly 20 that is in contact with a vehicle.
Figure 7:
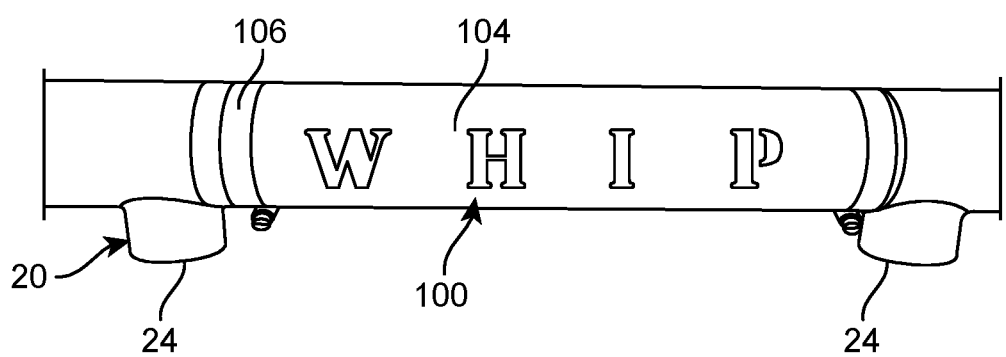
FIG. 7 displays face plate 104 mounted to rack assembly 20 via face plate clamp 106.

Referring now to FIGS. 5-7, the present invention may include a light assembly 100. In one embodiment light assembly 100 may include an LED strip 102 mounted to the exterior of rack assembly 20. In an alternate embodiment LED strip 102 may be internally mounted within rack assembly 20. The internally mounted LED strip may illuminate a face plate 104. The face plate 104 may be interchangeable with horizontal segment 21. Said face plate 104 may include a hollow tube with a cut out denoting indicia to allow for the illumination of the LED strip 102 to be visible from the exterior of rack assembly 20. It may be preferable for the illumination of the LED strip 102 to be controlled wirelessly via Bluetooth or Wi-Fi. Fastening the face plate 104 to the rack assembly 20 may be face plate clamp 106. The face plate clamp 106 may be a hose clamp that circumferentially secures face plate 104 in place of a horizontal segment 21 to rack assembly 20.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a flag holder for vehicles, comprising:
    a) a rack assembly including a series of interconnected tubes defining horizontal segments, wherein said horizontal segments are an attachment point said at least one mounted pole sleeve, said horizontal segments including opposing distal ends with an adjustable telescopic segment, said adjustable telescopic segment extending the reach of said horizontal segments in alignment with a perimeter of a truck bed lateral edges, wherein said horizontal segments are interchangeable with one of the horizontal segments which includes a face plate which includes a cut out denoting indicia, wherein said at least one mounted pole sleeve has a bottom portion and a top portion wherein each of said top portion of said at least one mounted pole sleeve is attached to said horizontal segments by means of a connecting portion, said at least one mounted pole sleeve is perpendicular to said horizontal segments, wherein each bottom portion of said at least one mounted pole sleeve includes an attachment portion perpendicularly attached thereto, said attachment portion extending backwards from said bottom portion of said at least one mounted pole sleeve, wherein said attachment portion has a bumper attached on a distal end thereof, said bumper is made of rubber, said bumper has an hemispherical shape; and
    b) a clamp assembly including a knob capping a threaded member extending therefrom, wherein said threaded member is received by a gripping member and a securing member, wherein said gripping member is mounted to a top portion of said rack assembly, said securing member locking said rack assembly into place by engaging on a rear portion of the rack assembly between said truck bed and a truck cabin, the gripping member may have a U-shaped profile, the gripping member may include two lateral portions engaging with said horizontal segments.

2. The system for a flag holder for vehicles of claim 1 wherein said rack assembly includes interconnected hollow PVC tubes.

3. The system for a flag holder for vehicles of claim 1 wherein said rack assembly includes said adjustable telescopic segment at both distal ends of said horizontal segments.

4. The system for a flag holder for vehicles of claim wherein said bumpers are semi domed shaped and threaded at the base to be mounted into said attachment portion.

5. The system for a flag holder for vehicles of claim 1 wherein said indicia of the face plate are illuminated by a wirelessly controlled LED strip.

6. The system for a flag holder for vehicles of claim 1 wherein said rack assembly includes a wirelessly controlled LED strip mounted on said horizontal segment.

7. A system for a flag holder for vehicles, consisting of:
    a) a rack assembly including a series of interconnected hollow PVC tubes defining horizontal segments, wherein said horizontal segments are an attachment point for three perpendicularly mounted pole sleeves with respect to the horizontal segments, said pole sleeves being hollow tubes with a top portion and a bottom portion, wherein said top portion of said pole sleeves is attached to said horizontal segments by means of a connecting portion, said pole sleeves are perpendicular to said horizontal segments, the top portion including a through hole to the exterior of the bottom portion, said bottom portion including an attachment portion, said attachment portion extends perpendicularly backwards from said bottom portion, said horizontal segments also including the attachment portion for rubber bumpers to be secured therein, said rubber bumpers having a semi dome shape with a threaded base received by said attachment portion, thereby lifting the horizontal segments and pole sleeves off of the surface of a truck bed the rack assembly is mounted to, the horizontal segments being interchangeable with a face plate secured to adjacent horizontal segments via a hose clamp, said face plate having a cut out portion denoting indicia, said cut out portion illuminated with an LED strip internally mounted within the rack assembly, wherein said LED strip is controlled wirelessly, said horizontal segments include two opposing distal ends with an adjustable telescopic segment, said adjustable telescopic segment extending the reach of said horizontal segments in alignment with a perimeter of a truck bed lateral edges; and b) a clamp assembly including a knob capping a threaded member extending therefrom, wherein said threaded member is received by a gripping member and a securing member, the gripping member may have a U-shaped profile, the gripping member may include two lateral portions engaging with said horizontal segments, said two lateral portions gripping a top-central portion of said rack assembly at a junction of the horizontal segments and the pole sleeves, said flat U-shaped member including a vertical hollow cylinder mounted opposite the horizontally folded portion to receive the threaded member, said securing member is located on the distal end of the threaded member relative to the knob, wherein said securing member includes a flat square portion with a front face and a rear face, said front face having a bottom portion with a lip curled towards said knob, the bottom lip of the gripping member may engage with an exterior lip of the truck bed, said rear face includes an elongated threaded hexagon to receive said threaded member, said elongated threaded hexagon locking said rack assembly into place by engaging with an exterior portion of said truck bed once the knob is turned, wherein said securing member locks said rack assembly into place by engaging on a rear portion of the rack assembly between said truck bed and a truck cabin.

* * * * *